US012549462B1

(12) United States Patent
Swaminathan

(10) Patent No.: US 12,549,462 B1
(45) Date of Patent: Feb. 10, 2026

(54) PACKET LOSS DETECTION IN REAL-TIME COMMUNICATIONS

(71) Applicant: WhatsApp LLC, Menlo Park, CA (US)

(72) Inventor: Arvind Swaminathan, San Jose, CA (US)

(73) Assignee: WhatsApp LLC, Menlo Park, CA (US)

( * ) Notice: Subject to any disclaimer, the term of this patent is extended or adjusted under 35 U.S.C. 154(b) by 251 days.

(21) Appl. No.: 18/157,707

(22) Filed: Jan. 20, 2023

(51) Int. Cl.
*H04L 43/0829* (2022.01)
(52) U.S. Cl.
CPC .............................. *H04L 43/0829* (2013.01)
(58) Field of Classification Search
CPC .................................................. H04L 43/0829
USPC ......................................................... 709/224
See application file for complete search history.

(56) References Cited

U.S. PATENT DOCUMENTS

| | | | |
|---|---|---|---|
| 6,947,379 B1* | 9/2005 | Gleichauf | H04L 45/24 370/356 |
| 7,681,101 B2 | 3/2010 | Oran et al. | |
| 8,036,223 B2 | 10/2011 | Sau et al. | |
| 8,116,215 B2 | 2/2012 | Park | |
| 8,305,913 B2 | 11/2012 | El-Hennawey et al. | |
| 11,394,839 B2* | 7/2022 | Kawaguchi | H04N 1/00458 |
| 11,848,747 B1* | 12/2023 | Ettus | H04W 72/02 |
| 2004/0066271 A1* | 4/2004 | Leck | G08C 17/02 340/3.1 |
| 2005/0105471 A1* | 5/2005 | Ido | H04L 65/80 370/241 |
| 2008/0037864 A1* | 2/2008 | Zhang | H04N 19/61 382/156 |
| 2013/0163444 A1* | 6/2013 | Tee | H04W 72/30 370/312 |
| 2017/0041242 A1* | 2/2017 | Isobe | H04L 47/2441 |
| 2018/0337866 A1* | 11/2018 | Jung | H04L 43/0864 |
| 2022/0330104 A1* | 10/2022 | Lee | H04L 65/1016 |

(Continued)

FOREIGN PATENT DOCUMENTS

EP        2256991 A1    12/2010

OTHER PUBLICATIONS

Alexander Gillis, Packet Loss, TECHTARGET, pp. 1-8 (Aug. 2021)(available at https://www.techtarget.com/searchnetworking/definition/packet-loss) (Year: 2021).*

(Continued)

*Primary Examiner* — David P Zarka
(74) *Attorney, Agent, or Firm* — EVERSHEDS SUTHERLAND (US) LLP

(57) ABSTRACT

A method includes determining a packet loss rate in a real-time communication event based on a size of a packet block in a received sequence comprising multiple packets, determining a number of packet loss clusters within the packet block based on the packet loss rate, identifying one of a random loss pattern or a burst loss pattern based on the number of packet loss clusters or based on whether packet loss pattern matches a geometric distribution, including an error correction bit in at least one of the packets in the packet block when a random loss pattern is identified, and reducing a packet transmission rate when a burst loss pattern is identified. A system including a memory storing instructions which, when executed by a processor, cause the system to perform the above method, is also provided.

18 Claims, 9 Drawing Sheets

(56) References Cited

U.S. PATENT DOCUMENTS

2023/0188447 A1\* 6/2023 Alleyne .................. H04L 47/30
                                                            709/224
2024/0414514 A1\* 12/2024 Xiao ..................... H04W 84/18

OTHER PUBLICATIONS

"Geometric Distribution—Wikipedia," Retrieved from Internet: https://en.wikipedia.org/w/index.php?title=Geometric_distribution&direction=prev&oldid=1134293900, Dec. 14, 2022, 10 pages.

Zanaty M., et al. "RTP Payload Format for Flexible Forward Error Correction (FEC)," Internet Engineering Task Force (IETF), Jul. 2019, 41 pages.

\* cited by examiner

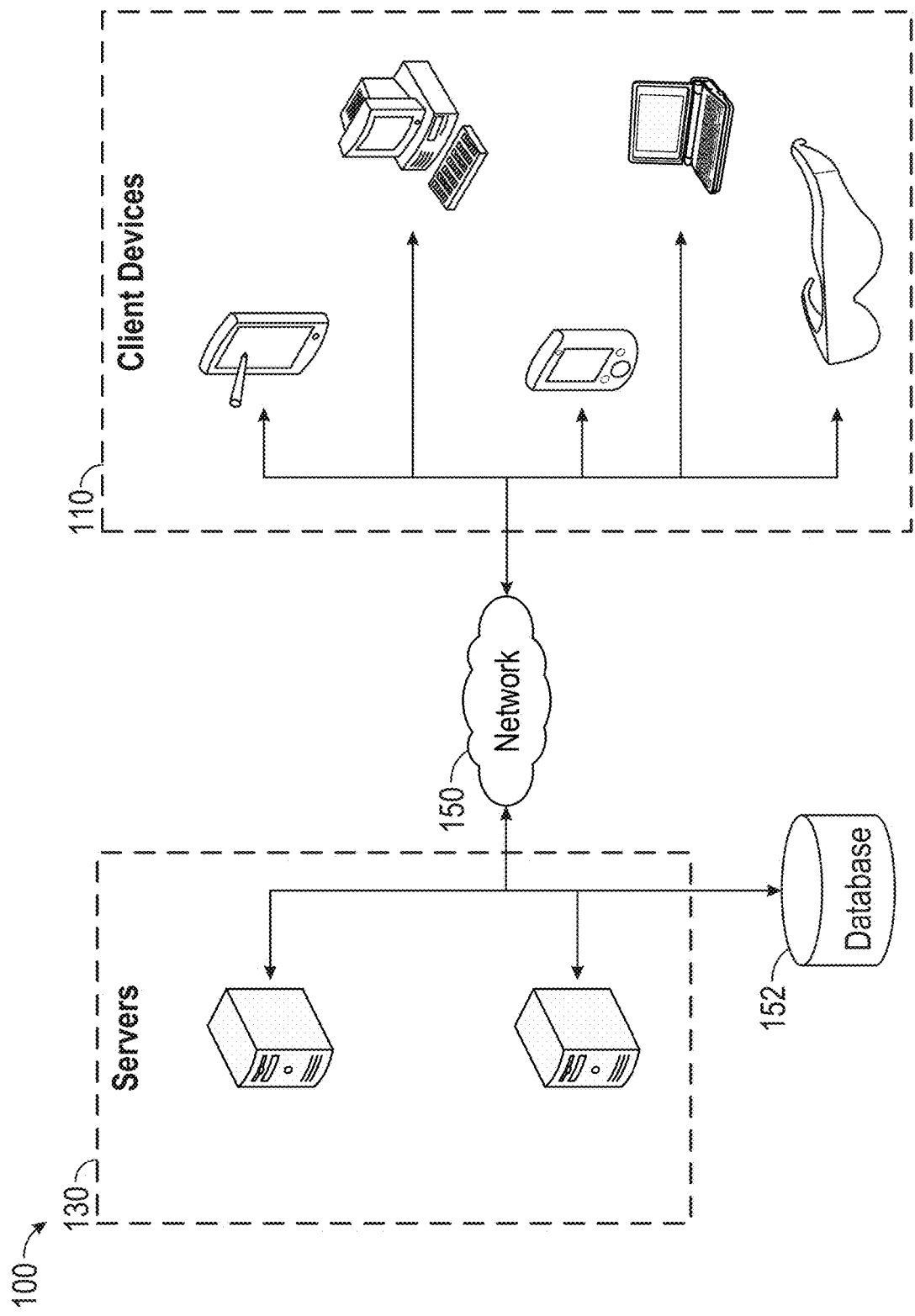

PACKET LOSS DETECTION IN REAL-TIME COMMUNICATIONS

BACKGROUND

Field

The present disclosure is related to packet loss detection in real-time communications such as group conference calls and the like. More specifically, the present disclosure is related to identifying random packet loss events and burst packet loss events for diagnostic of a call.

Related Art

Packet loss is a hindrance for real-time communications (RTC) and causes annoyance to users: cutoff calls, loss of important voice/audio, video freezes, and the like. One approach to deal with packet losses depends on whether the packet loss is result of network congestion or random network drops. In the former case, the packet loss should be used as a sign to reduce the sending rate and alleviate congestion. In the latter case, the ideal response is to use forward error correction (FEC) bits such as parity calculations and the like, in addition to packet redundancy. Using the FEC approach when packet loss is due to congestion, exacerbates the problem instead of solving it. Similarly, reducing sending rate when packet loss is due to random network drops will result in the network bandwidth not being fully utilized and result in delivering poor perceived quality (blurrier video, worse sounding audio). Hence, identifying the type of packet loss (random vs bursty) is very important in achieving the best performance in a RTC system.

SUMMARY

In a first embodiment, a computer-implemented method includes determining a packet loss rate in a real-time communication event based on a size of a packet block in a received sequence comprising multiple packets, determining a number of packet loss clusters within the packet block based on the packet loss rate, identifying one of a random loss pattern or a burst loss pattern based on the number of packet loss clusters, including an error correction bit in at least one of the packets in the packet block when a random loss pattern is identified, and reducing a packet transmission rate when a burst loss pattern is identified.

In a second embodiment, a system includes a memory storing multiple instructions, and one or more processors configured to execute the instructions to cause the system to perform operations. The operations include to determine a packet loss rate in a real-time communication event based on a size of a packet block in a received sequence comprising multiple packets, to determine a number of packet loss clusters within the packet block based on the packet loss rate, to identify one of a random loss pattern or a burst loss pattern based on the number of packet loss clusters, to include an error correction bit in at least one of the packets in the packet block when a random loss pattern is identified, and to reduce a packet transmission rate when a burst loss pattern is identified.

In a third embodiment, a non-transitory, computer-readable medium stores instructions which, when executed by a processor, cause a computer to perform a method. The method includes determining a packet loss rate in a real-time communication event based on a size of a packet block in a received sequence comprising multiple packets, determining a number of packet loss clusters within the packet block based on the packet loss rate, identifying one of a random loss pattern or a burst loss pattern based on the number of packet loss clusters, including an error correction bit in at least one of the packets in the packet block when a random loss pattern is identified, and reducing a packet transmission rate when a burst loss pattern is identified.

In other embodiments, a system includes a first means for storing instructions and a second means for executing the instructions to cause the system to perform a method. The method includes determining a packet loss rate in a real-time communication event based on a size of a packet block in a received sequence comprising multiple packets, determining a number of packet loss clusters within the packet block based on the packet loss rate, identifying one of a random loss pattern or a burst loss pattern based on the number of packet loss clusters, including an error correction bit in at least one of the packets in the packet block when a random loss pattern is identified, and reducing a packet transmission rate when a burst loss pattern is identified.

In yet other embodiments, a system is configured to determine a distribution of packet losses as a function of inter-packet distance, in a real-time communication event. The system compares the distribution to a geometric distribution and determines that the packet loss event is a random packet loss event when the distribution is closer to a geometric distribution than a pre-selected threshold.

These and other embodiments will be clear to one of ordinary skill in the art, in view of the following.

BRIEF DESCRIPTION OF THE FIGURES

FIG. 1 illustrates a network architecture for detecting packet loss in real-time communications, according to some embodiments.

In the figures, elements having the same or similar reference numeral are associated with the same or similar attributes, unless explicitly mentioned otherwise.

DETAILED DESCRIPTION

Figure 2A:
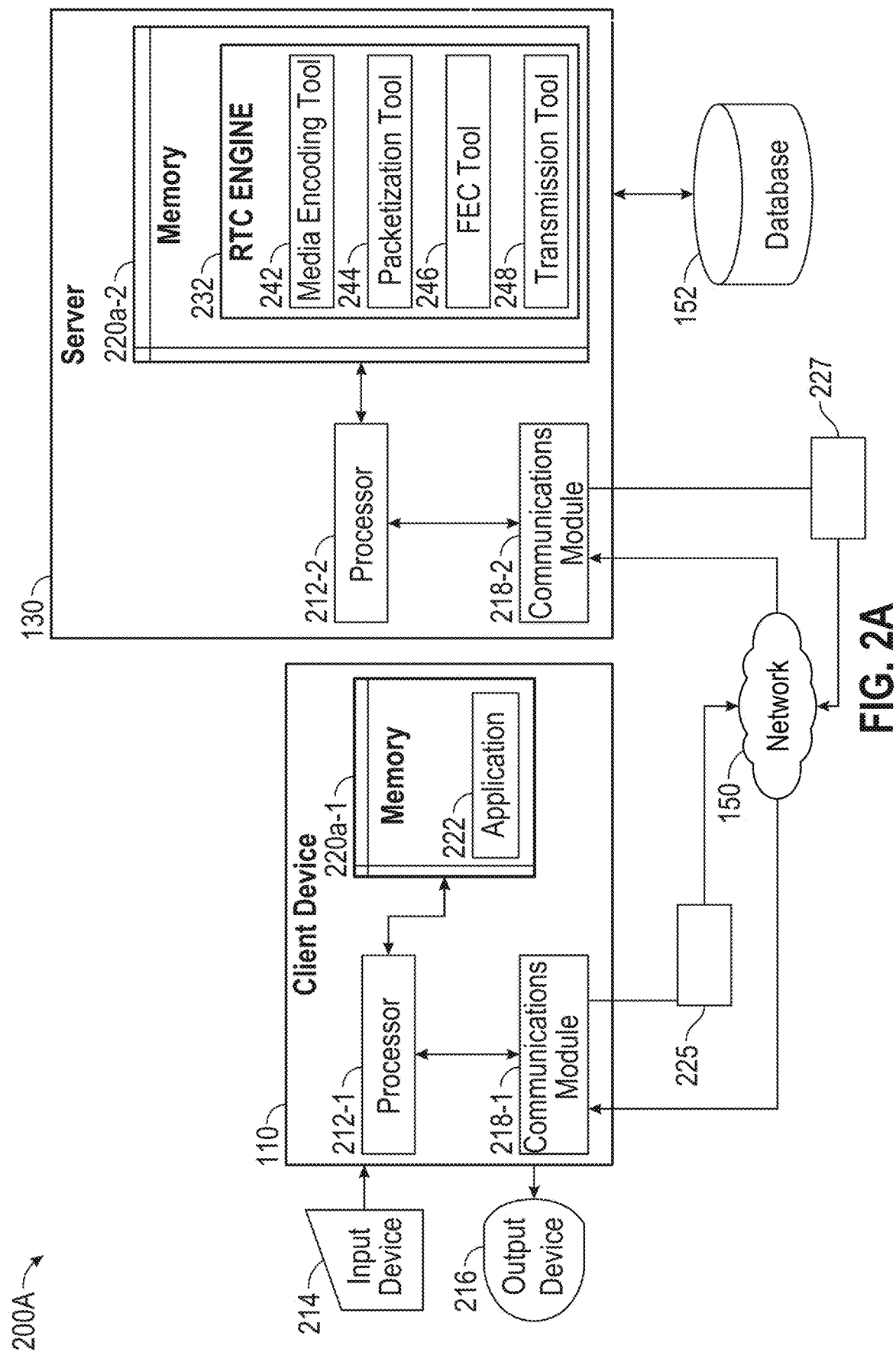
FIG. 2A-2B are block diagrams illustrating an example server, client device, and a database from the architecture in FIG. 1, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In real-time communications (RTC) such as encountered during one-on-one telephone conversations, group chats, teleconferences and the like, packet loss is a fairly common occurrence. Sometimes, packet loss events occur in a seemingly random manner, and sometimes they occur in rapid succession bursts. Differentiating between burst packet loss and random packet loss can be used to improve the performance of the RTC platform.

To recover from packet loss without having to retransmit lost packets, some approaches use parity-bit forward error correction (ULP-FEC). However, FEC techniques use some of the communication bandwidth to transmit parity bits, which may not be desirable, especially in low connectivity configurations. To compensate for a reduced bandwidth when FEC bits are used, lower quality video data is used so that the combination of FEC and data can use the available bandwidth. In addition to lower quality, FEC bits increase the likelihood that the video encoder overshoots its target (e.g., increased redundancy, and the like). The overshoot in turn causes temporary congestion, leading to audio/video breaks.

Use of parity bits to recover data is feasible when the number of missing data bits is below a certain threshold. However, when packet loss rate surpasses this threshold, the strategy becomes onerous. As a result, the sender starts using FEC bits only when the receiver sees a sustained and relatively low packet loss rate. Accordingly, many RTC implementations use FEC bits when the advantages justify the cost in bandwidth and performance. These approaches achieve moderate and somewhat inconsistent improvement in RTC.

To resolve the above technical problem, embodiments as disclosed herein improve packet recovery in RTC based on a classification that distinguishes between a random pattern or a burst pattern of packet loss events.

Accordingly, some embodiments adjust ULP-FEC generation based on whether the packet loss occurs in a random loss pattern or a burst loss pattern. For example, the parity bits may be added in a column (burst) or row (random) to maximize the number of missing packets that can be recovered. Random loss patterns are uncorrelated to each other and are likely to be spread apart. In this case, using row-level FEC will be more efficient. For burst loss patterns, column level FEC is more efficient.

Burst loss patterns are a strong indication that network congestion may be causing packet loss. This can be used to optimize the data transmission process: When a burst loss pattern is detected, then a decrease in packet transmission rate may likely reduce packet loss. More specifically, when network congestion is the cause of packet loss, FEC may not be necessary. In fact, adding FEC in such circumstances may be counterproductive because the reduced bandwidth availability increases network congestion (e.g., video overshoot), exacerbating the problem.

For random loss patterns with high bandwidth availability (e.g., higher than maximum video bandwidth used in RTC), the system may increase FEC bits safely, while keeping a high video encoding rate, thus recovering packet losses and maintaining high video quality (e.g., little or no audio/video freezes). It has been observed that this is a common scenario over Wi-Fi in developed markets, during peak hours.

Example System Architecture

FIG. 1 illustrates a network architecture 100 for identifying a packet loss pattern in an RTC, according to some embodiments. Servers 130 and a database 152 are communicatively coupled with client devices 110 via a network 150. Servers 130 may host an RTC application (e.g., a messaging application, a chat application, a conferencing application, and the like) running in client devices 110. Client devices 110 may be used by participants in the communications (e.g., chats involving two or more participants). Client devices 110 may include smart phones, laptops, mobile devices, palm devices, and even desktops. In some embodiments, client devices 110 may include virtual reality or augmented reality (VR/AR) headsets and/or smart glasses, and the content shared may include images, videos, and immersive reality elements. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like. Database 152 may store media items such as pictures, images, videos, and VR/AR elements such as avatars, spark features, and the like. Accordingly, in some embodiments an RTC application may be hosted in one of the client devices 110.

Figure 2B:
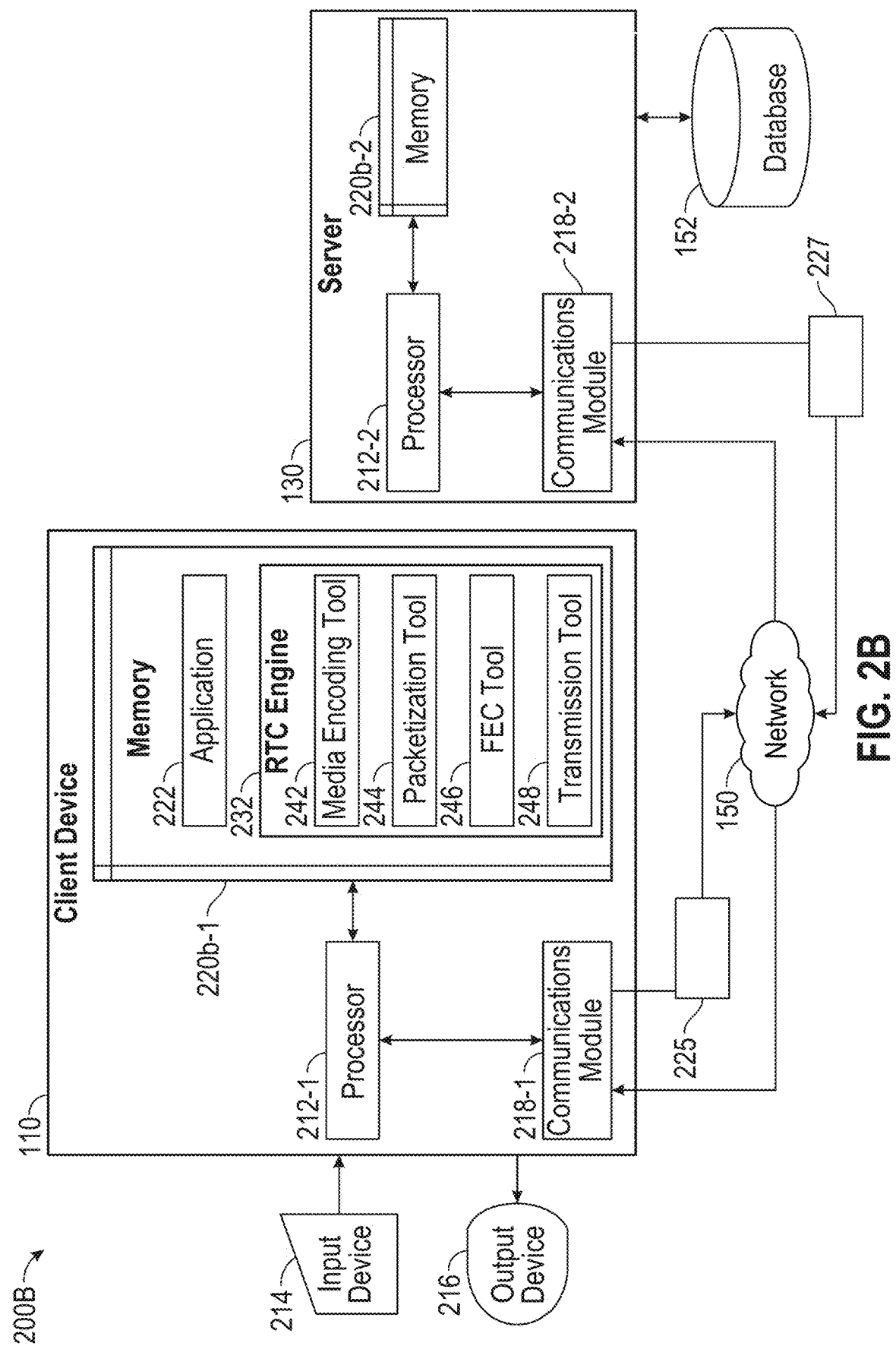

FIGS. 2A and 2B are block diagrams 200A and 200B (hereinafter, collectively referred to as "block diagrams 200") illustrating an example server 130, client device 110, and database 152 from architecture 100, according to some embodiments. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150 in datasets 225 (from client device 110 to server 130) and 227 (from server 130 to client device 110). Communications modules 218 can be, for example, modems or Ethernet cards, and may include radio hardware and software for wireless communications (e.g., via electromagnetic radiation, such as radiofrequency -RF-, near field communications -NFC-, Wi-Fi, and Bluetooth radio technology). A user may interact with client device 110 via an input device 214 and an output device 216. Input device 214 may include a mouse, a keyboard, a pointer, a touchscreen, a microphone, a joystick, a virtual joystick, and the like. In some embodiments, input device 214 may include cameras, microphones, and sensors, such as touch sensors, acoustic sensors, inertial motion units -IUs- and other sensors configured to provide input data to a VR/AR headset. Output device 216 may be a screen display, a touchscreen, a speaker, and the like. Accordingly, client device 110 may provide a dataset 225 to server 130, and server 130 may provide a dataset 227 to client device 110. Datasets 225 and 227 may include a stream or sequence of packets with encoded media file such as a video, image, or a VR/AR object from client device 110.

In block diagram 200A, client device 110 may include a memory 220a-1 and a processor 212-1. Memory 220a-1 may include a communications application 222, configured to run in client device 110 and couple with input device 214 and output device 216. Application 222 may be downloaded by the user from server 130 and may be hosted by server 130. Execution of application 222 may be controlled by processor 212-1. In some embodiments, client device 110 is a VR/AR headset and application 222 includes an immersive reality application (e.g., an immersive communications application). In some embodiments, client device 110 is a mobile phone that can collect a video or image of a participant in a communication transaction hosted by application 222. A server 130 includes a memory 220a-2, a processor 212-2, and communications module 218-2. Hereinafter, processors 212-1 and 212-2, and memories 220a-1 and 220a-2 (hereinafter, collectively referred to as "memories 220a"), will be collectively referred to, respectively, as "processors 212" and "memories 220a." Processors 212 are configured to execute instructions stored in memories 220. In some embodiments, memory 220a-2 includes an RTC engine 232. A participant in a communication transaction may access RTC engine 232 using client device 110, through application 222. RTC engine 232 may share or provide media files such as images, video, music, or sound files, and even VR/AR features such as avatars and other objects to application 222 via dataset 227 from one or more parties in an RTC event. For example, dataset 227 may include a stream or sequence of packets including a conference feed, to one of the participants with client device 110. RTC engine 232 includes a media encoding tool 242, a packetization tool 244, a forward error correction (FEC) tool 246, and a transmission tool 248. Media encoding tool 242 receives raw data from a media capturing device (e.g., a video camera and/or a microphone), and encoded the media data into a transferable format. Packetization tool 244 splits a data stream from media encoding tool 242 into packets that will be included in dataset 227. Packetization tool 244 also performs packet loss analysis and statistics, such as identifying a packet loss pattern and applying corrective measures thereof. One of the corrective measures may include calculating a forward error correction (FEC) bit with FEC tool 246. Transmission tool 248 prepares metadata for each of the packets prepared by packetization tool 244. In some embodiments, transmission tool 248 selects a fixed number of packets in a block, for packet loss handling. Accordingly, and based on a packet loss pattern, transmission tool 248 may update the number of packets 310-1, 310-2, in a block in real time. In some embodiments, RTC engine 232 and the tools contained therein and at least part of database 152 may be hosted in a different server that is accessible by server 130 or client device 110.

In block diagram 200B, client device 110 may include a memory 220b-1 and a processor 212-1. Memory 220b-1 may include a communications application 222, as described above. A server 130 includes a memory 220a-2, a processor 212-2, and communications module 218-2. Hereinafter, memories 220b-1 and 220b-2, will be collectively referred to as "memories 220b." In some embodiments, memory 220a-1 includes an RTC engine 232a, media encoding tool 242, packetization tool 244, forward error correction (FEC) tool 246, and transmission tool 248, as disclosed above.

Figure 3:
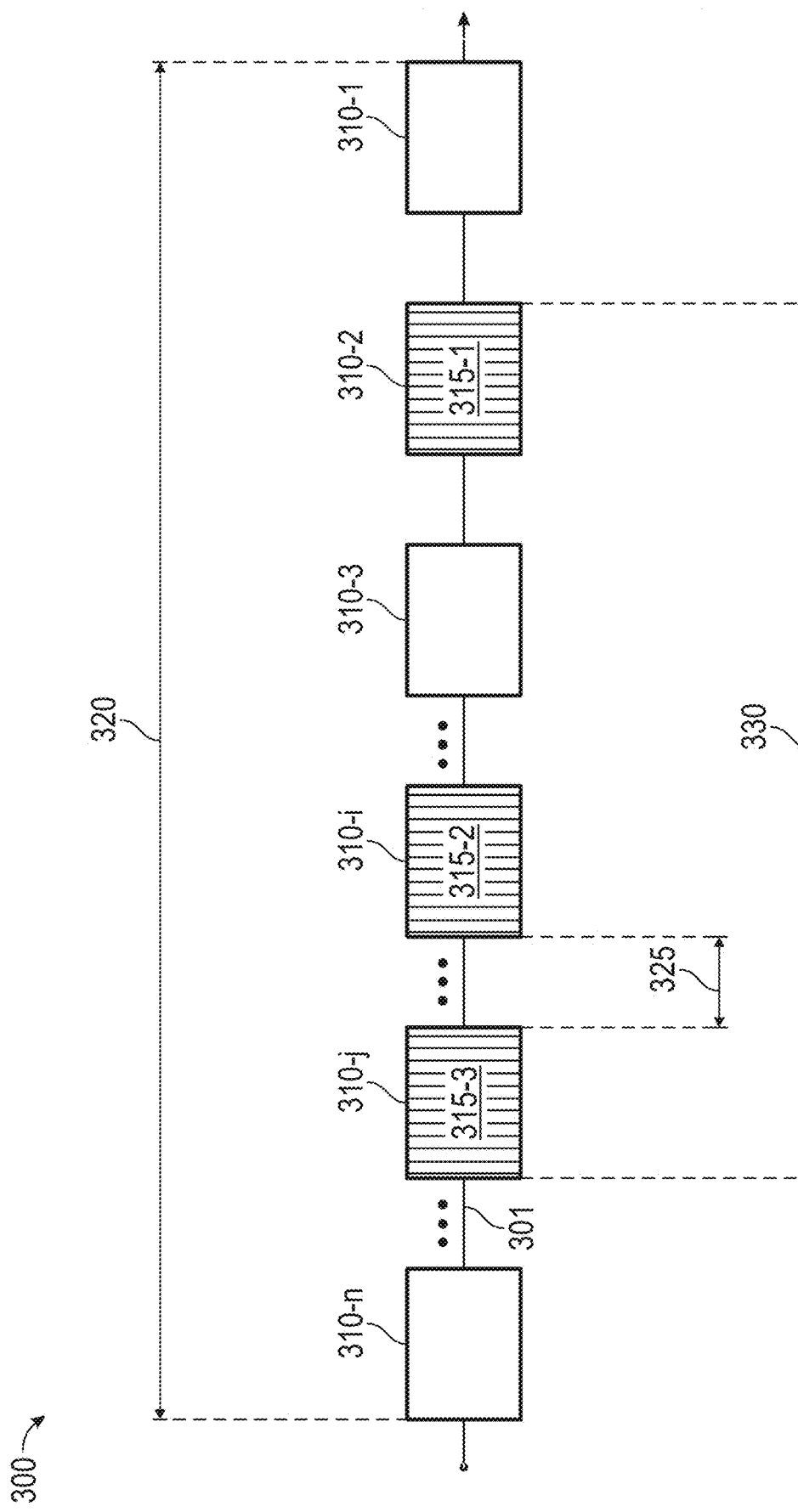
FIG. 3 illustrates a block in a received sequence, including multiple packets and one or more loss packets forming a pattern, according to some embodiments.

FIG. 3 illustrates a block 300 with multiple packets 310-1, 310-2, 310-3, 310-i, 310-j, and 310-n (hereinafter, collectively referred to as "packets 310") including one or more lost packets 315-1, 315-2, and 315-3 (hereinafter, collectively referred to as "lost packets 315") forming a pattern in a received sequence 301, according to some embodiments. Received sequence 301 is shown so that packets 310 are numbered in the order they were originally transmitted by a sender (1, 2, . . . n). The picture in received sequence 300 assumes an a-posteriori knowledge that lost packets 315 did not reach the receiver (and may need to be re-sent at a later time, in a different block). Accordingly, for illustrative purposes, it may be assumed that lost packets 315 have been lost in a first transmission attempt.

Block 300 has a pre-selected size 320 (defined as an integer number of packets, n, transmitted in block 300). In general, all blocks 300 have the same size 320. Pre-selected size 320 represents a trade-off between accuracy and latency for updating the packet loss type prediction. Hence, pre-selected block size 320 may be adjusted or updated based on various factors including but not limited to: time since call start, network type (WiFi vs cellular), current sending rate operating point and network configuration. An inter-packet distance 325 is the number of successfully transmitted packets 310 between two successive lost blocks. A cluster 330 of lost packets 315 may include one or more successfully transmitted packets (e.g., packet 310-3), and has a defined size (e.g., by the number of packets -lost or not-) included therein.

A packet loss rate may be defined as a ratio:

$$PLR=\text{Num\_lost\_packets}/n \quad (1)$$

To ensure a high accuracy, some embodiments proceed with a classification of a loss pattern when PLR has a high enough value (e.g., greater than about 5%, or so). Low PLR configurations may be handled using an FEC bit, without substantive loss of bandwidth. This assessment is made on a case by case application, as the network configuration and/or traffic may vary dramatically in different circumstances (e.g., environmental, social, stochastic events, and the like).

Within block 300, clusters 330 may be identified by defining a cluster start when either a lost packet 315 is the first one in block 300 (e.g., 315-1) or inter-packet distance 325 is greater than a pre-selected threshold. The pre-selected threshold may be a maximum number of correlated packets ($N_{max\_corr}$). In general, $N_{max\_corr}$ is a function of the overall packet loss rate (PLR) seen in the block. Accordingly, in some embodiments, a good starting value for $N_{max\_cor}$ can start as $N_{max\_corr}=n \times PLR$.

A random loss pattern can be distinguished from a burst loss pattern based on values such as a number of clusters in block 300, and average distance between clusters 330 (e.g., the number of packets 310 between the last lost packet 315 in a first cluster 330 and the first lost packet 315 in the subsequent cluster 330). Other parameters of interest for distinguishing a random loss pattern from a burst loss pattern may include an average number of lost packets in each cluster 330, and an average inter-packet distance 325 within a single cluster 330. More detailed statistical analysis may also be useful. For example, a random loss pattern may include a more uniform distribution of inter-cluster distance, whereas a burst loss pattern may include a longer inter-cluster distance (on average), and a shorter inter-packet distance 325 within a single cluster 330.

Figure 4:
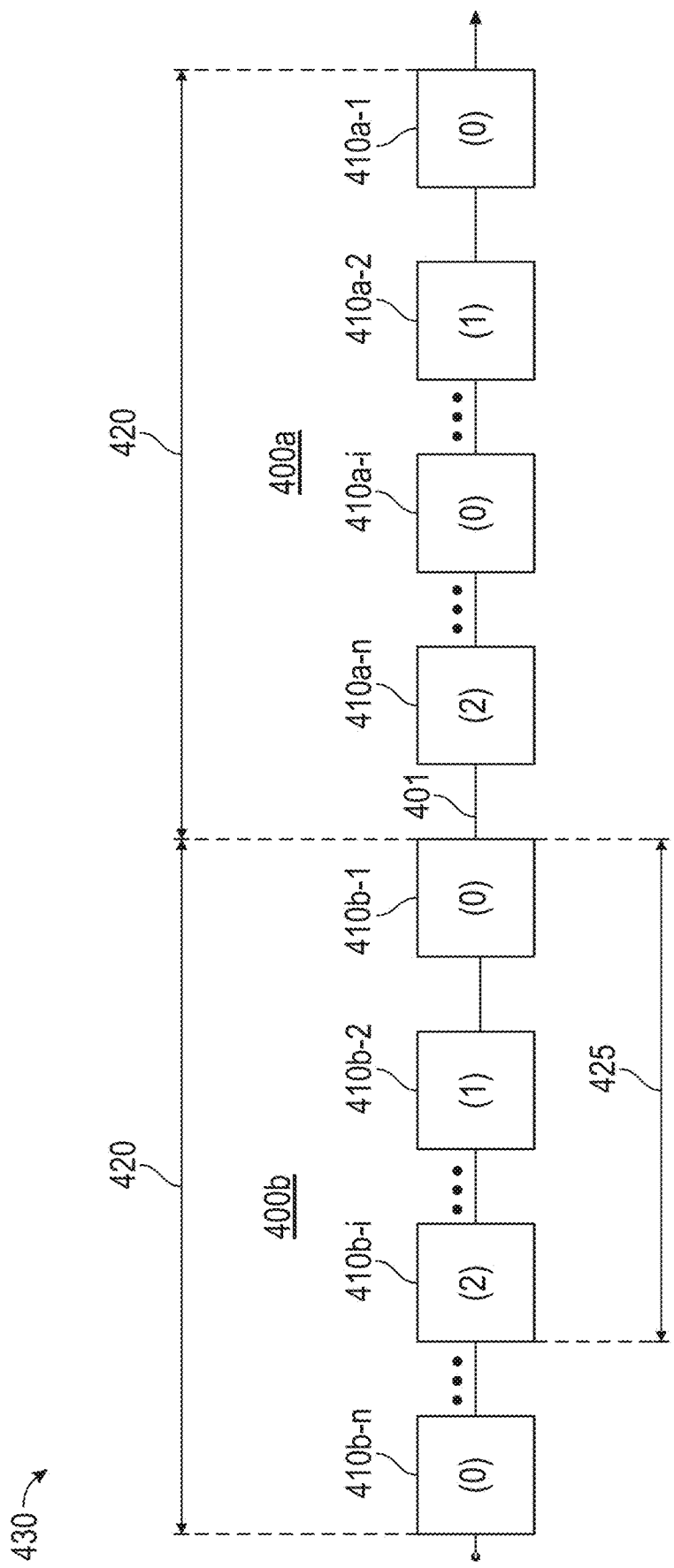
FIG. 4 illustrates two consecutive blocks in window 430 of a received sequence and a cutoff packet to close the second window, according to some embodiments.

FIG. 4 illustrates two consecutive blocks 400a and 400b (hereinafter, collectively referred to as "blocks 400") in a window 430 to check received sequence 401 and a cutoff packet 410b-j, according to some embodiments. In methods consistent with the present disclosure, it is desirable to maintain a window 430 including consecutive blocks 400, having size 420 (e.g., n). It may be desirable to adjust block size 420 to make the analysis more efficient and accurate. Cutoff packet 410b-j closes block 400b after an adjusted block size 425, according to some embodiments. Accordingly, each of blocks 400 include packets 410a-1, 410a-2, 410a-j, 410a-n, 410b-1, 410b-2, 410b-j, and 410b-n (hereinafter, collectively referred to as "packets 410"). Some of packets 410 may be transmitted successfully (1), some may be re-transmitted (2), (e.g., recovered through FEC bits), and some may be lost (0, on first transmission, or irretrievably lost).

A packet loss classifier assigns each packet 410 as lost (0). When a packet 410a-n or 410b-n is received (hereinafter, collectively referred to as "tail packet 410"), the calculator determines if it is retransmission (2) or original (0). In some embodiments, packet loss classifier may perform a re-transmission identification to assign a packet 410 as retransmitted (2). When tail packet 410 is not retransmitted, the status is changed to (1). When tail packet 410 is recovered through FEC, its status is set to 2. Packets 410 with status 2 are included in the PLR calculation (cf. Eq. 2).

Block 400b is closed when a packet 410b-n is tracked. In some embodiments, block 400b may be closed before, at cutoff packet 410b-j, when the value, j, is no less than:

$$j \geq n_{close} \cdot RTT \quad (2)$$

Where $n_{close}$ and RTT are suitably selected threshold values. In some embodiments, an initial value for $n_{close}$ is $n_{close}=n$.

Figure 5:
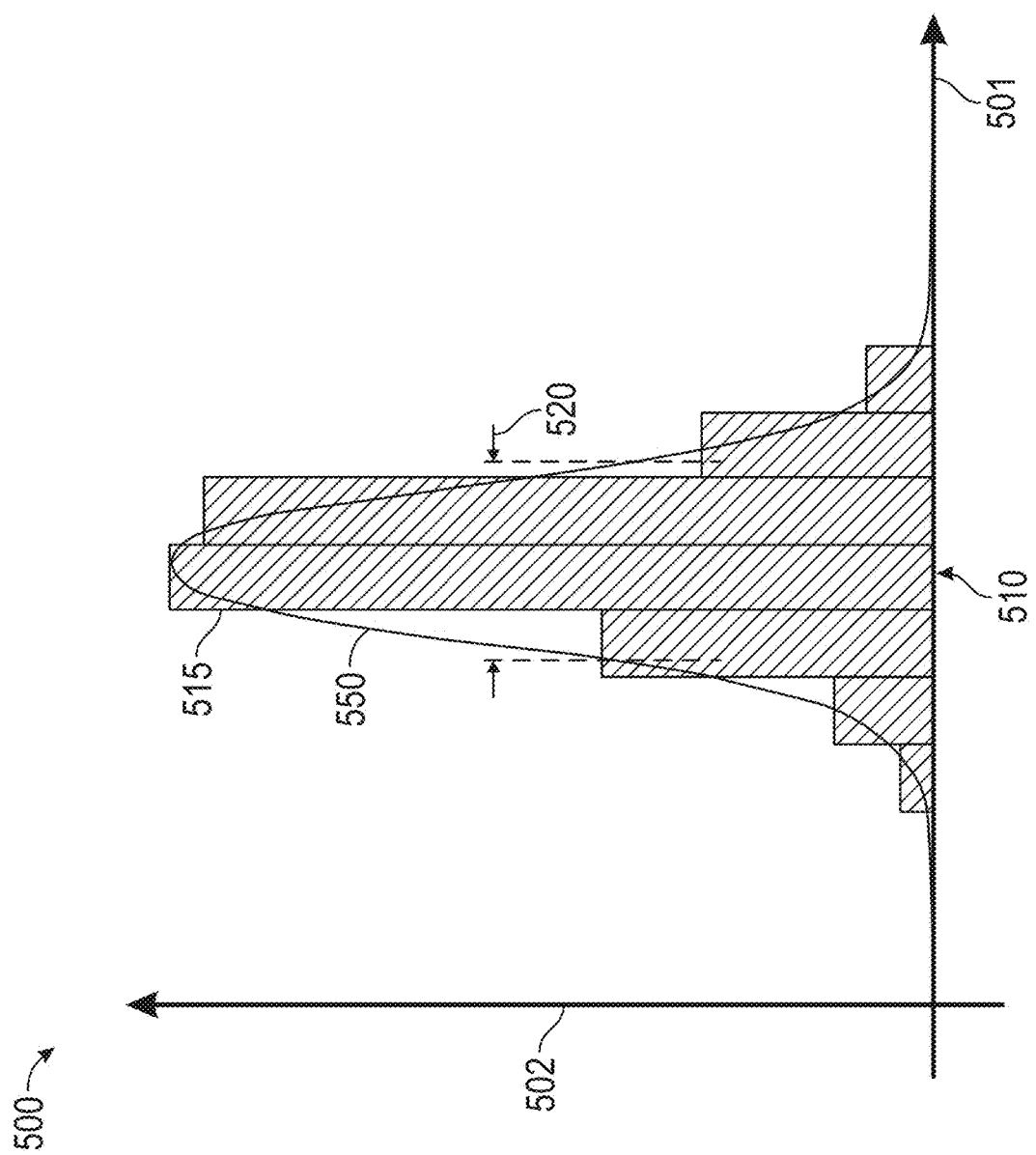
FIG. 5 illustrates a distribution of loss packets as a function of inter-packet distance in a received sequence, according to some embodiments.

FIG. 5 illustrates a distribution 500 of lost packets indicating a loss probability, P(k), 502 as a function of inter-packet distance, k, 501 (cf. inter-packet distance 325) in a received sequence, according to some embodiments. Distribution 500 has an average inter-packet distance 510 and a variance 520. In general, a histogram 515 of packet loss may be approximated by a smooth curve 550. A distribution 500 may be generated from lost data packets with an inter-packet distance 501 in a received sequence, as disclosed herein (cf. data packets 310 and 410, lost packets 315, received sequences 301 and 401, and inter-packet distance 325).

When packet losses are truly independent from one another (e.g., caused by a random occurrence), distribution 500 is expected to obey the following mathematical rule:

$$P(k) = (1-p)^{k-1} \cdot p \quad (3)$$

where p PLR (cf. Eq. 1). The opposite case, e.g., a strongly correlated packet loss configuration, may lead to a burst loss pattern.

Accordingly, to distinguish a random loss pattern from a burst loss pattern, a system as disclosed herein performs a statistical analysis to determine how close is distribution 500 to Eq. (3).

Accordingly, in some embodiments, the system may determine expected values and compare to those of a geometric distribution. For example, an expected probability value:

$$\langle P \rangle = \frac{1}{PLR} = n/n_{lost} \quad (4)$$

A variance:

$$\sigma = \frac{(1-PLR)}{PLR^2} \quad (5)$$

Accordingly, some embodiments include determining the mean and variance using the observed packet loss to find distribution 500, and comparing those heuristic values with Eqs. 4-5.

The loss pattern is classified as random when both Eqs. (4) and (5) are satisfied, to a desired level of accuracy. For example, the accuracy may be determined to be a certain percent threshold level of the values obtained in Eqs. (4-5), such as 90%, 95%, or even more.

Figure 6:
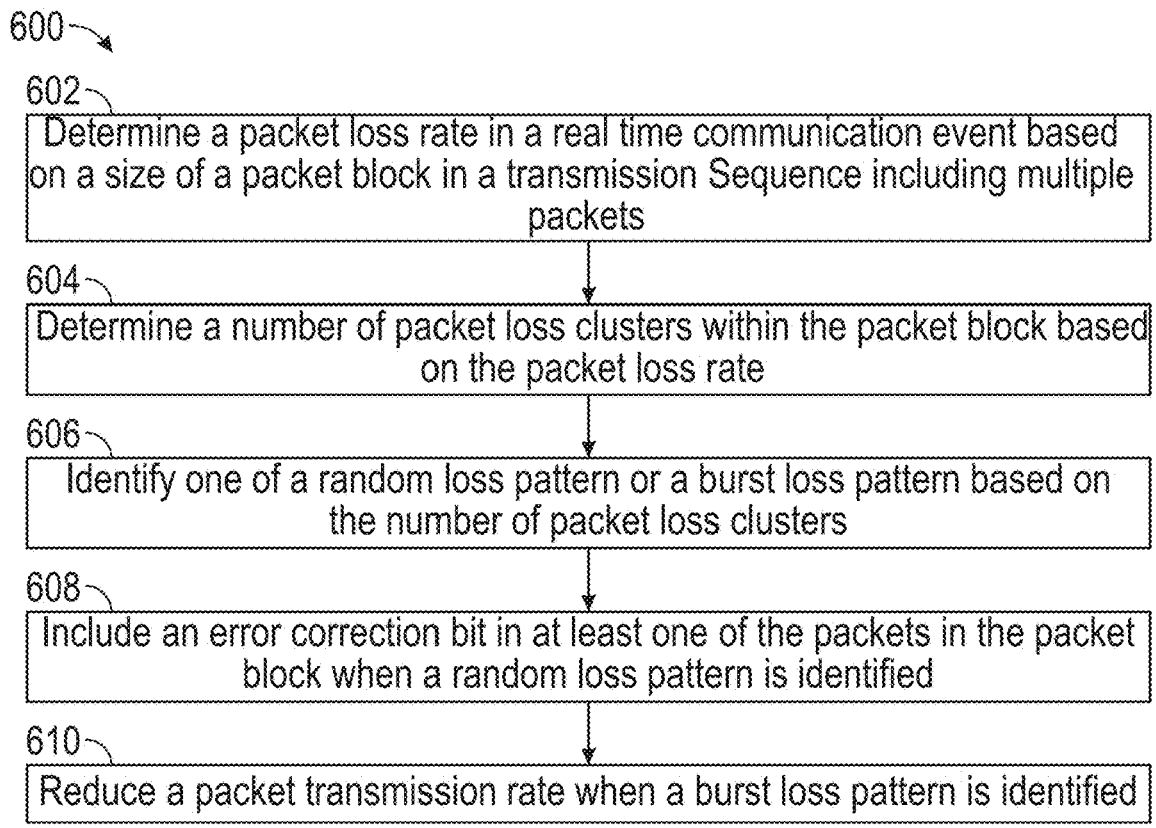
FIG. 6 is a flow chart illustrating steps in a method for identifying a burst packet loss event and a random packet loss event in real-time communications, according to some embodiments.

FIG. 6 is a flow chart illustrating steps in a method 600 for identifying a burst packet loss event and a random packet loss event in real-time communications, according to some embodiments. In some embodiments, at least one or more of the steps in method 600 may be performed by a processor executing instructions stored in a memory, in a client device, a remote server or a database, through a network, using a communications module, as disclosed herein (e.g., processors 212, memories 220, communications modules 218, client devices 110, servers 130, databases 152, and network 150). In some embodiments, the instructions may be part of an RTC application hosted by an RTC engine running a media encoding tool, a packetization tool, an FEC tool, and a transmission tool, as disclosed herein (e.g., application 222, RTC engine 232, media encoding tool 242, packetization tool 244, FEC tool 246, and transmission tool 248). In some embodiments, a method consistent with the present disclosure may include one or more of the steps in method 600 performed in a different order, simultaneously, quasi-simultaneously, or overlapping in time.

Step 602 includes determining a packet loss rate in a real-time communication event based on a size of a packet block in a received sequence comprising multiple packets. In some embodiments, step 602 includes determining whether a packet in the received sequence is a retransmitted packet or a fresh packet, and including the retransmitted packet in the packet loss rate. In some embodiments, step 602 includes selecting the size of the packet block in the received sequence and forming a test window in the received sequence that includes at least two packet blocks. In some embodiments, step 602 includes determining a number of packet loss within the packet block. In some embodiments, step 602 includes identifying a packet loss cluster as a plurality of lost packets in the packet block that are separated in the received sequence by fewer than a packet correlation number. In some embodiments, step 602 includes identifying a maximum number of packets that are correlated in the received sequence based on a total packet loss in the packet block.

Step 604 includes determining a number of packet loss clusters within the packet block based on the packet loss rate.

Step 606 includes identifying one of a random loss pattern or a burst loss pattern based on the number of packet loss clusters. In some embodiments, step 606 includes determining that a packet loss distribution follows a geometric distribution. In some embodiments, step 606 includes verifying that the packet loss rate is higher than a pre-selected value. In some embodiments, step 606 includes determining an average packet distance between packet loss clusters in a packet block. In some embodiments, step 606 includes determining an average packet distance between missing packets within a packet loss cluster, in a packet block.

Step 608 includes adding an error correction bit in at least one of the packets in the packet block when a random loss pattern is identified. In some embodiments, step 608 includes reducing the size of the packet block for N blocks after a call start. In some embodiments, step 608 includes increasing the size of the packet block, N blocks after a call start.

Step 610 includes reducing a packet transmission rate when a burst loss pattern is identified.

Figure 7:
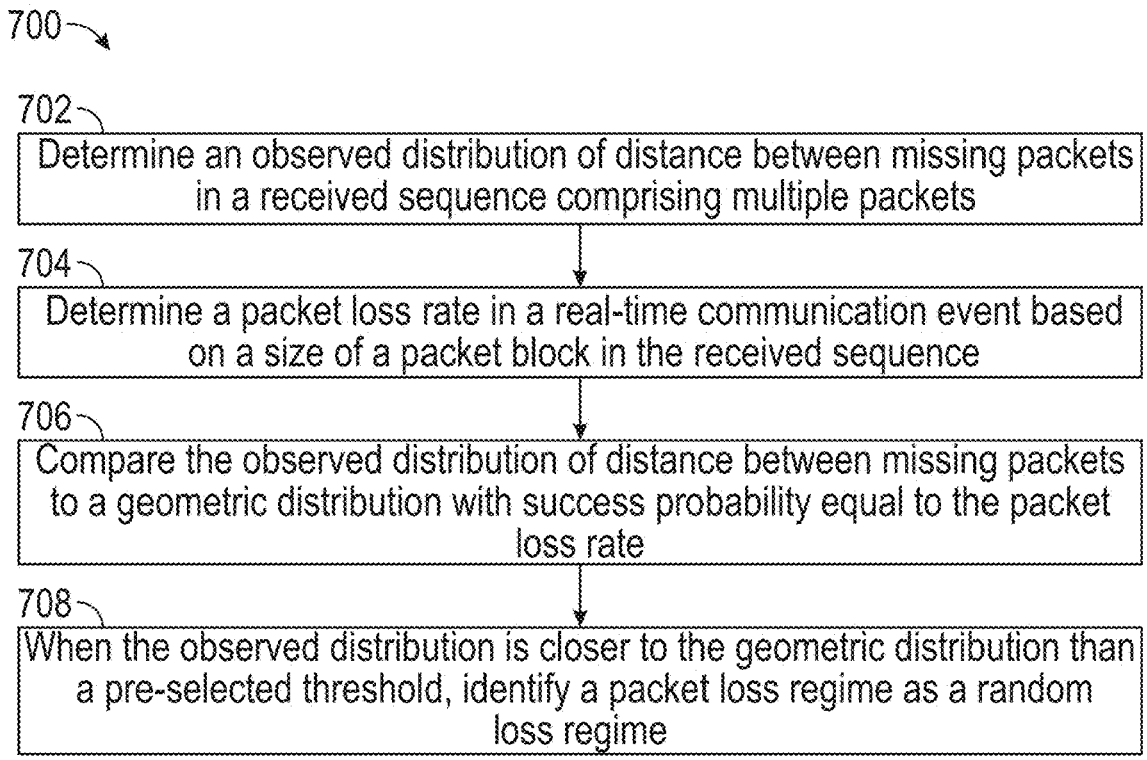
FIG. 7 is a flow chart illustrating steps in a method for identifying a random packet loss regime based on a similarity of a packet loss distribution with a geometric distribution, according to some embodiments.

FIG. 7 is a flow chart illustrating steps in a method 700 for identifying a random packet loss regime based on a similarity of a packet loss distribution with a geometric distribution, according to some embodiments. In some embodiments, at least one or more of the steps in method 700 may be performed by a processor executing instructions stored in a memory, in a client device, a remote server or a database, through a network, using a communications module, as disclosed herein (e.g., processors 212, memories 220, communications modules 218, client devices 110, servers 130, databases 152, and network 150). In some embodiments, the instructions may be part of an RTC application hosted by an RTC engine running a media encoding tool, a packetization tool, an FEC tool, and a transmission tool, as disclosed herein (e.g., application 222, RTC engine 232, media encoding tool 242, packetization tool 244, FEC tool 246, and transmission tool 248). In some embodiments, a method consistent with the present disclosure may include one or more of the steps in method 700 performed in a different order, simultaneously, quasi-simultaneously, or overlapping in time.

Step 702 includes determining an observed distribution of distance between missing packets in a received sequence comprising multiple packets.

Step 704 includes determining a packet loss rate in a real-time communication event based on a size of a packet block in the received sequence.

Step 706 includes comparing the observed distribution of distance between missing packets, to a geometric distribution with success probability equal to the packet loss rate.

Figure 8:
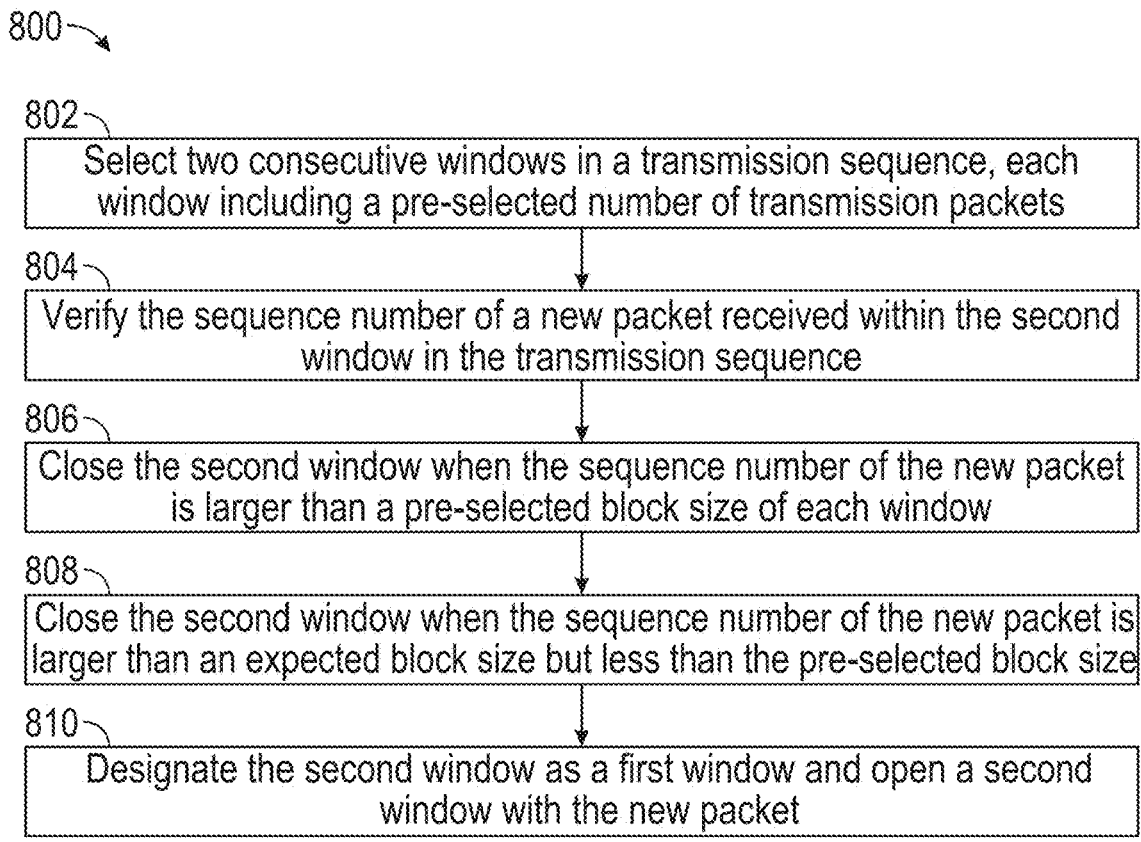
FIG. 8 is a flow chart illustrating steps in a method for closing a window check in a received sequence for real-time communications, according to some embodiments.

When the observed distribution is closer to the geometric distribution than a pre-selected threshold, step 708 includes identifying a packet loss regime as a random loss regime FIG. 8 is a flow chart illustrating steps in a method 800 for closing a window check in a received sequence for real-time communications, according to some embodiments. In some embodiments, at least one or more of the steps in method 800 may be performed by a processor executing instructions stored in a memory, in a client device, a remote server or a database, through a network, using a communications module, as disclosed herein (e.g., processors 212, memories 220, communications modules 218, client devices 110, servers 130, databases 152, and network 150). In some embodiments, the instructions may be part of an RTC application hosted by an RTC engine running a media encoding tool, a packetization tool, an FEC tool, and a transmission tool, as disclosed herein (e.g., application 222, RTC engine 232, media encoding tool 242, packetization tool 244, FEC tool 246, and transmission tool 248). In some embodiments, a method consistent with the present disclosure may include one or more of the steps in method 800 performed in a different order, simultaneously, quasi-simultaneously, or overlapping in time.

Step 802 includes selecting two consecutive windows in a received sequence, each window including a pre-selected number of transmission packets.

Step 804 includes verifying the sequence number of a new packet received within the second window in the received sequence.

Step 806 includes closing the second window when the sequence number of the new packet is larger than a pre-selected block size of each window.

Step 808 includes closing the second window when the sequence number of the new packet is larger than an expected block size but less than the pre-selected block size.

Step 810 includes designating the second window as a first window and opening a second window with the new packet.

Figure 9:
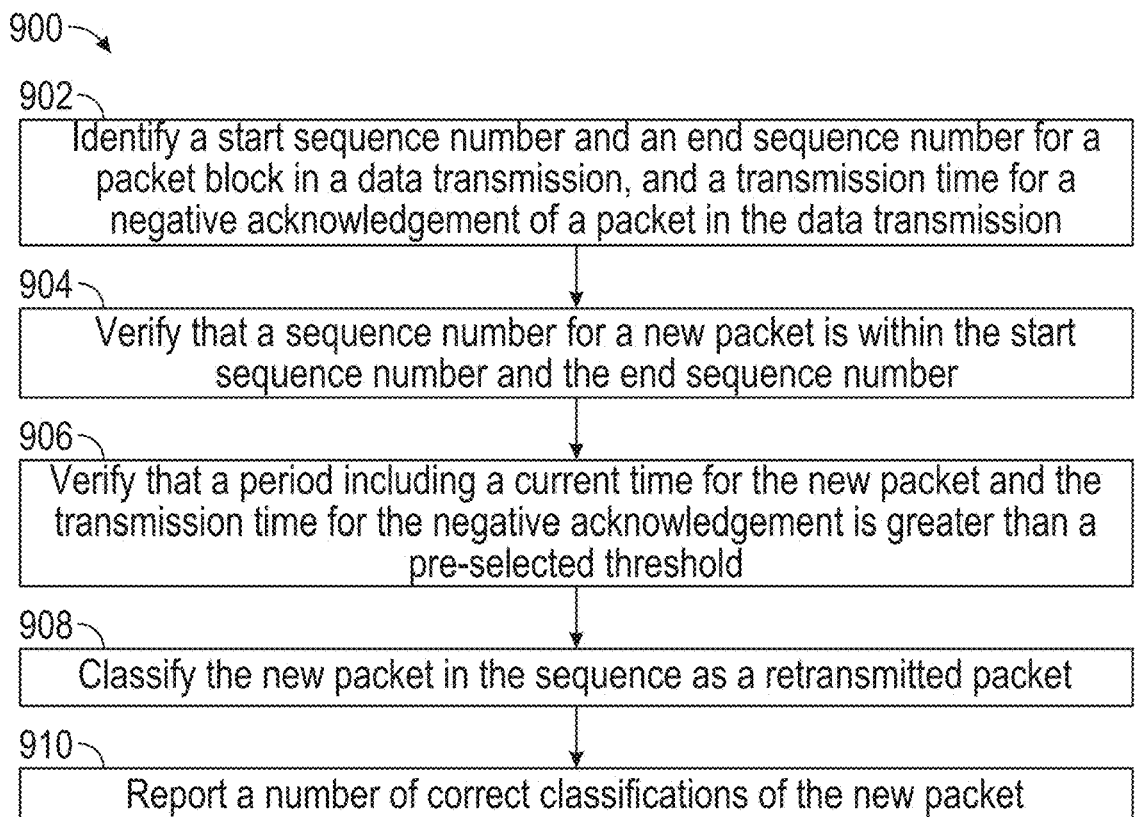
FIG. 9 is a flow chart illustrating steps in a method for detecting a retransmitted packet in a received sequence for real-time communications, according to some embodiments.

FIG. 9 is a flow chart illustrating steps in a method 900 for detecting a retransmitted packet in a received sequence for real-time communications, according to some embodiments. In some embodiments, at least one or more of the steps in method 900 may be performed by a processor executing instructions stored in a memory, in a client device, a remote server or a database, through a network, using a communications module, as disclosed herein (e.g., processors 212, memories 220, communications modules 218, client devices 110, servers 130, databases 152, and network 150). In some embodiments, the instructions may be part of an RTC application hosted by an RTC engine running a media encoding tool, a packetization tool, an FEC tool, and a transmission tool, as disclosed herein (e.g., application 222, RTC engine 232, media encoding tool 242, packetization tool 244, FEC tool 246, and transmission tool 248). In some embodiments, a method consistent with the present disclosure may include one or more of the steps in method 900 performed in a different order, simultaneously, quasi-simultaneously, or overlapping in time.

Step 902 includes identifying a start sequence number and an end sequence number for a packet block in a data transmission, and a transmission time for a negative acknowledgement of a packet in the data transmission.

Step 904 includes verifying that a sequence number for a new packet is within the start sequence number and the end sequence number.

Step 906 includes verifying that a period including a current time for the new packet and the transmission time for the negative acknowledgement is greater than a pre-selected threshold. In some embodiments, the pre-selected threshold could be a function of the current round-trip time between clients in the RTC call.

Step 908 includes classifying the new packet in the sequence as a retransmitted packet.

Step 910 includes reporting a number of correct classifications of the new packet.

Hardware Overview

Figure 10:
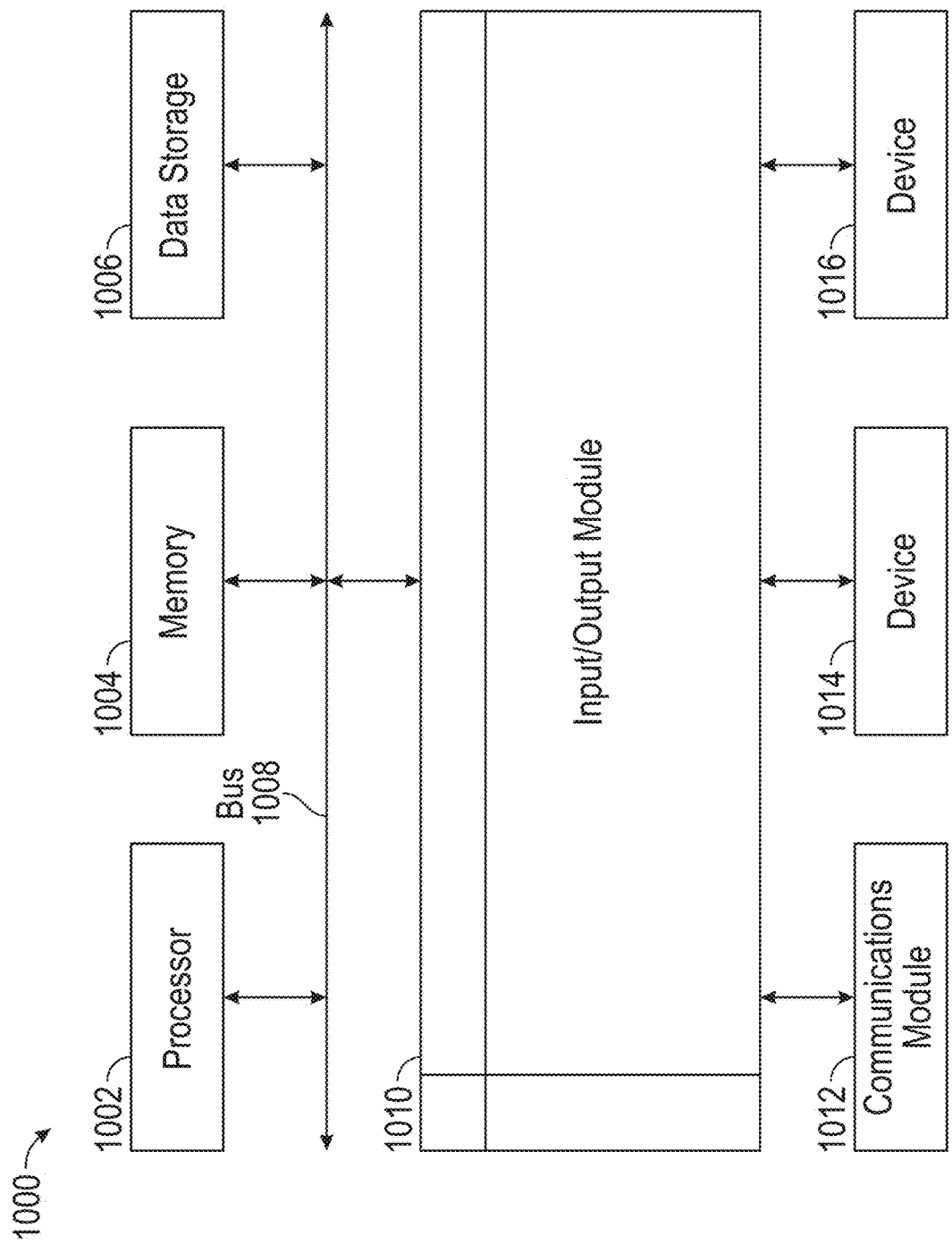
FIG. 10 is a block diagram illustrating an exemplary computer system with which servers and other client devices, and the methods in FIGS. 6-8 can be implemented, according to some embodiments.

FIG. 10 is a block diagram illustrating an exemplary computer system 1000 with which headsets and other client devices 110, and methods 600, 700, 800 and 900 can be implemented, according to some embodiments. In certain aspects, computer system 1000 may be implemented using hardware or a combination of software and hardware, either in a dedicated server, or integrated into another entity, or distributed across multiple entities. Computer system 1000 may include a desktop computer, a laptop computer, a tablet, a phablet, a smartphone, a feature phone, a server computer, or otherwise. A server computer may be located remotely in a data center or be stored locally.

Computer system 1000 includes a bus 1008 or other communication mechanism for communicating information, and a processor 1002 (e.g., processors 212) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer-readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PUP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled with bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, input/output module 1010 is configured to connect to a plurality of devices, such as an input device 1014 and/or an output device 1016. Exemplary input devices 1014 include a keyboard and a pointing device, e.g., a mouse or a trackball, by which a consumer can provide input to the computer system 1000. Other kinds of input devices 1014 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1016 include display devices, such as an LCD (liquid crystal display) monitor, for displaying information to the consumer.

According to one aspect of the present disclosure, headsets and client devices 110 can be implemented, at least partially, using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   determining a packet loss rate associated with a real-time communication event based on a size of a first packet block;
   determining a number of packet loss clusters within the first packet block based on the packet loss rate;
   identifying, based on the number of packet loss clusters, a first loss pattern indicative of a random packet loss;
   in response to identifying the first loss pattern, including an error correction bit in a packet in the first packet block;
   identifying a second loss pattern in a second packet block, wherein the second loss pattern is indicative of network congestion; and
   in response to identifying the second loss pattern, reducing a packet transmission rate in the second packet block;
   wherein identifying the first loss pattern or the second loss pattern is based on an average packet distance between packet loss clusters in the first packet block.

2. The computer-implemented method of claim 1, wherein determining the packet loss rate further comprises determining that a packet is a retransmitted packet.

3. The computer-implemented method of claim 1, further comprising selecting the size of the first packet block or second block and forming a test window that includes at least two packet blocks.

4. The computer-implemented method of claim 1, wherein determining the packet loss rate further comprises determining a number of packets lost within the first packet block.

5. The computer-implemented method of claim 1, wherein a packet loss cluster comprises a plurality of lost packets that are separated by fewer than a pre-determined number of packets.

6. The computer-implemented method of claim 1, wherein determining the number of packet loss clusters is based on a total packet loss in the first packet block or second packet block.

7. The computer-implemented method of claim 1, wherein identifying the first loss pattern further comprises determining that a packet loss distribution follows a geometric distribution.

8. The computer-implemented method of claim 1, wherein identifying the second loss pattern further comprises verifying that the packet loss rate is higher than a threshold value.

9. The computer-implemented method of claim 1, wherein identifying the first loss pattern or the second loss pattern is based on an average packet distance between missing packets within a packet loss cluster.

10. The computer-implemented method of claim 1, further comprising reducing the size of the first packet block or second packet block for a selected number of blocks.

11. The computer-implemented method of claim 1, further comprising increasing the size of the first packet block or second packet block for a selected number of blocks.

12. A system, comprising:
   a memory storing multiple instructions; and
   one or more processors configured to execute the instructions to cause the system to:
      determine a packet loss rate associated with a real-time communication event based on a size of a first packet block;
      determine a number of packet loss clusters within the first packet block based on the packet loss rate, wherein a packet loss cluster comprises a plurality of lost packets that are separated by fewer than a pre-determined number of packets;
      identify, based on the number of packet loss clusters, a first loss pattern indicative of a random packet loss;
      in response to identifying the first loss pattern, include an error correction bit in a packet in the first packet block;
      identify a second loss pattern in a second packet block, wherein the second loss pattern is indicative of network congestion; and
      in response to identifying the second loss pattern, reduce a packet transmission rate in the second packet block.

13. The system of claim 12, wherein determining the packet loss rate further comprises determining that a packet is a retransmitted packet rate.

14. The system of claim 12, wherein the one or more processors further execute instructions to select the size of the first packet block or the second packet block and forming a test window that includes at least two packet blocks.

15. The system of claim 12, wherein determining the packet loss rate further comprises determining a number of packets lost within the first packet block.

16. The system of claim 12, wherein determining the number of packet loss clusters within the first packet block or the second packet block based on a total packet loss in the first packet block or the second packet block.

17. The system of claim 12, wherein identifying the first loss pattern further comprises that a packet loss distribution follows a geometric distribution.

18. A computer-implemented method, comprising:
   determining a packet loss rate associated with a real-time communication event based on a size of a first packet block;

determining a number of packet loss clusters within the first packet block based on the packet loss rate, wherein the packet loss cluster comprises a plurality of lost packets that are separated by fewer than a pre-determined number of packets;

identifying, based on the number of packet loss clusters, a first loss pattern indicative of a random packet loss;

in response to identifying the first loss pattern, including an error correction bit in a packet in the first packet block;

identifying a second loss pattern in a second packet block, wherein the second loss pattern is indicative of network congestion; and in response to identifying the second loss pattern, reducing a packet transmission rate in the second packet block.

* * * * *